(12) United States Patent
Williamson

(10) Patent No.: US 7,336,897 B2
(45) Date of Patent: Feb. 26, 2008

(54) LIQUID-COOLED COMBUSTION CAMERA

(75) Inventor: David L. Williamson, Greer, SC (US)

(73) Assignee: General Electric Company, Schenectady, NY (US)

( * ) Notice: Subject to any disclaimer, the term of this patent is extended or adjusted under 35 U.S.C. 154(b) by 255 days.

(21) Appl. No.: 11/162,702

(22) Filed: Sep. 20, 2005

(65) Prior Publication Data
US 2007/0065141 A1    Mar. 22, 2007

(51) Int. Cl.
G03B 19/00 (2006.01)
G03B 17/48 (2006.01)
G03B 29/00 (2006.01)

(52) U.S. Cl. ................ 396/429; 431/13; 431/75
(58) Field of Classification Search ............ None
See application file for complete search history.

(56) References Cited

U.S. PATENT DOCUMENTS 4,749,337 A * 6/1988 Dickinson et al. ...... 417/199.1
2004/0240866 A1* 12/2004 Ramsbottom ............. 396/17
2006/0088793 A1* 4/2006 Brummel et al. ......... 431/13

* cited by examiner

Primary Examiner—Patrick Assouad
Assistant Examiner—Warren K Fenwick
(74) Attorney, Agent, or Firm—Sutherland Asbill & Brennan LLP

(57) ABSTRACT

A liquid-cooled camera assembly that includes a camera for viewing the combustion process in an industrial gas turbine that further includes a tri-concentric tube assembly, and a window cap positioned at a first end of the tri-concentric tube assembly. The camera may be positioned adjacent to and behind the window cap. The tri-concentric tube assembly may form channels between the tubes that direct the flow of coolant to the camera from an inlet and from the camera to an outlet. The coolant may be water. The window cap may be cylindrical and may not exceed 1 inch (2.54 cm) in diameter. The window cap may be brazed quartz.

20 Claims, 3 Drawing Sheets

LIQUID-COOLED COMBUSTION CAMERA

TECHNICAL FIELD

The present invention generally relates to camera assemblies for viewing commercial combustion processes and, more particularly, but not by way of limitation, to combustion cameras that are liquid-cooled.

BACKGROUND OF THE INVENTION

Combustion cameras have been designed and used for the visualization of the combustion process in industrial gas turbines. The known design have utilized air to cool the camera used in the assembly, which generally is a charged-coupled device ("CCD") camera. Because of the limitations associated with using air as a coolant, these assemblies were relatively large. Nevertheless, these assemblies were still not sufficiently cooled, which often caused the CCD camera to malfunction because of its sensitivity to heat. The larger size required by the air cooling medium necessitated approximately a 2.0-inch (about 5 cm) diameter opening in the combustion chamber to view the combustion process. An opening of this size, however, is generally larger than what is acceptable in commercial gas turbines.

Further, the known combustion cameras assemblies generally had been mounted on the outside of the gas turbine such that only a small portion of the camera, such as a lens set, extended into the high temperature and high pressure turbine environment. Mounting the combustion camera entirely inside the gas turbine, as now required by many commercial gas turbines, may greatly overheat the CCD camera and result in failure.

Known combustion cameras generally included as a design feature a threaded mechanical fastener and gasket arrangement to mount and seal the quartz window cap, which is the transparent layer through which the CCD camera views the combustion process. This arrangement, however, has two undesirable effects: (1) a large camera housing diameter and (2) frequent servicing of the gaskets due to deterioration in the high temperature environment.

Known combustion cameras also have included assemblies that have been adapted from camera designs used for viewing the combustion process in boilers. These adapted assemblies also were air-cooled and, as a result, were large in size. Another popular design included the separation of the lens from the camera. The lens of such camera assemblies generally included a "lens sets" that was used to project the combustion process image back to the CCD camera, which was located outside of the boiler. This arrangement allowed only the lens sets to be located in the extreme temperature and pressure conditions of the turbine. The drawbacks of this design include light attenuation and image distortion. Light attenuation prevents observation of low light aspects of the combustion process, such as observing the spark during the ignition process. Image distortion causes the image to be somewhat blurry, which prevents the observation of the fine details of the combustion process.

Many of the newer industrial gas turbines require that combustion camera assemblies be designed to satisfy the following criteria: (1) operate while installed entirely within a 350 psi, 825° F. (24.6 kg/cm$^2$, 440° C.) environment and while viewing a 3000° F. (1650° C.) combustion process; (2) cooled in such a manner that the cooling medium is not exhausted into the combustor, which can affect the combustion process thus making it not representative of the actual process; (3) view the combustion process through a 1.0-inch (about 2.5 cm) diameter opening; (4) limit the amount of light attenuation such that the CCD camera is able to view the operation of the spark plug during the combustion ignition process; (5) have an overall small size envelope that satisfies the space limitations of the commercial turbine and combustion test stand; and (6) be capable of many hours of operation without servicing due to the limited and difficult access to its location in the turbine or test stand. Accordingly, there is a long felt need for a combustion camera assembly that satisfies these requirements and improves upon the several limitations found in known designs that have been described above.

SUMMARY OF THE INVENTION

The present application thus may describe a liquid-cooled camera assembly that includes a camera for viewing the combustion process in an industrial gas turbine that further includes a tri-concentric tube assembly, and a window cap positioned at a first end of the tri-concentric tube assembly. The camera may be positioned adjacent to and behind the window cap and the tri-concentric tube assembly may form channels between the tubes that direct the flow of coolant to the camera from an inlet and from the camera to an outlet. The coolant may be water.

In some embodiments, the width of the window cap may not exceed 1 inch (2.54 cm) in length. In other embodiments, the window cap may be cylindrical and may not exceed 1 inch (2.54 cm) in diameter. The window cap may be brazed quartz. The liquid-cooled combustion camera may further include a liquid circulation means for delivering a flow of liquid coolant to the inlet and draining the flow of liquid coolant from the outlet.

In some embodiments, the liquid-cooled combustion camera further may include a housing that is connected to a second end of a tri-concentric tube assembly. The housing may include the inlet, which is connected to a supply hose, and the outlet, which is connected to a drain hose. The housing further may include a plurality of housing channels that direct the flow of water from the inlet to the tri-concentric tube assembly and from the tri-concentric tube assembly to the outlet.

In other embodiments, the tri-concentric tube assembly may include an inner camera tube, an intermediate camera tube, and an outer camera tube. The inner camera tube may be positioned within the intermediate camera tube to create a first coolant channel and the intermediate camera tube may be positioned within the outer camera tube to create a second coolant channel. A first housing channel may direct the flow of coolant from the inlet to the first coolant channel and a second housing channel may direct the flow of coolant from the second coolant channel to the outlet.

These and other features of the present invention will become apparent upon review of the following detailed description of the preferred embodiments when taken in conjunction with the drawings and the appended claims.

DETAILED DESCRIPTION

Figure 1:
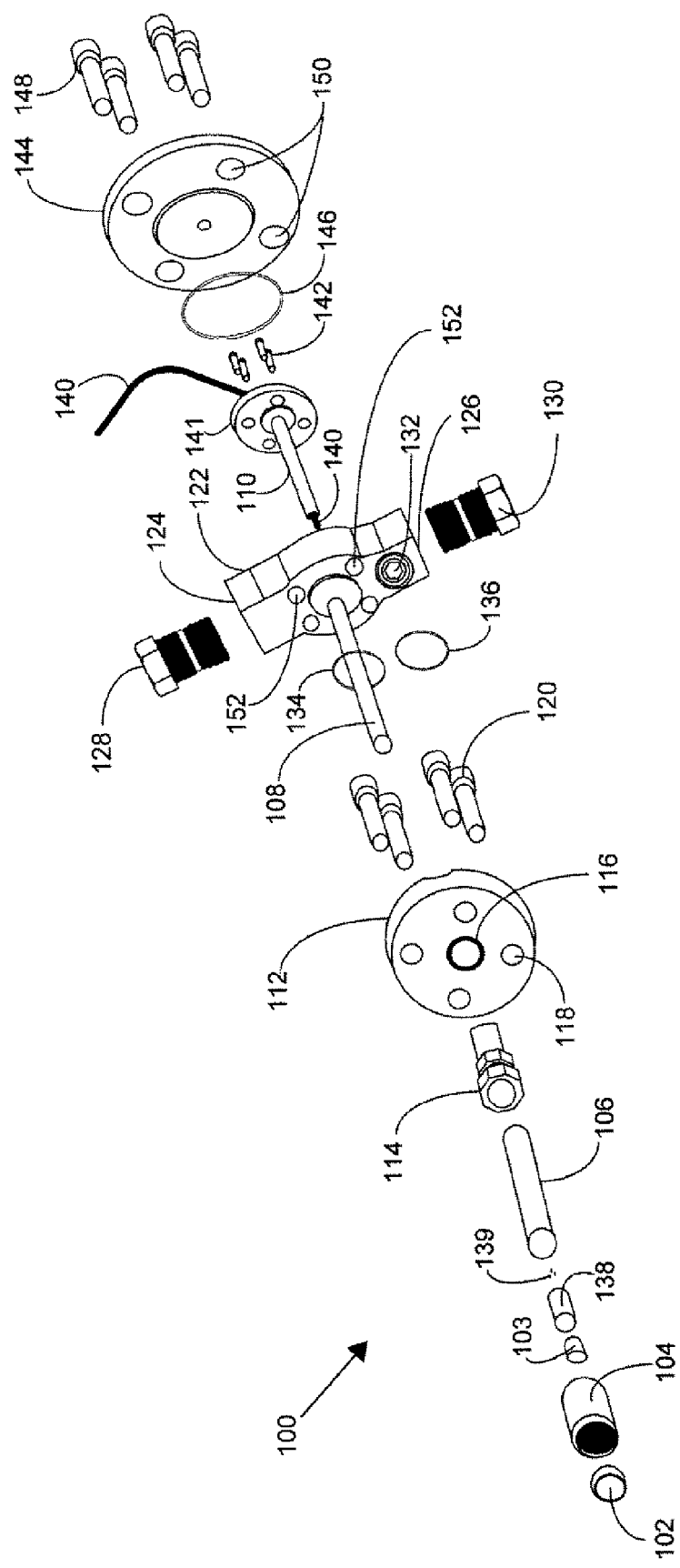
FIG. 1 is an exploded view illustrating an embodiment of a liquid-cooled combustion camera of the present invention.

Referring now to the drawings, in which like numerals refer to like elements throughout the several views, FIG. 1 demonstrates an embodiment of a liquid-cooled combustion camera assembly 100 as described herein. The liquid-cooled combustion camera 100 may include a window cap 102. The window cap 102 may be made of a brazed quartz material known in the art, such as GE-214. The window cap 102 may be a transparent pressure boundary for a camera 103 to view the combustion process. Other known materials also may be used for the window cap 102 as long as they provide the necessary physical properties for operating in the combustion environment while allowing for a transparent window through which the camera 103 may view the combustion process. The diameter of the window cap 102 may be approximately one inch (about 2.54 cm) or less. The thickness of the window cap 102 may be between ⅛ and ¼ inches (about 3.18 and 6.35 cm). The window cap 102 may be secured in a window cap holder 104.

The liquid-cooled combustion camera assembly 100 further may include a tri-concentric tube configuration, which may include a outer camera tube 106, a intermediate camera tube 108, and an inner camera tube 110. The tri-concentric tube configuration may be made of stainless steel, inconel, or other similar materials known in the art. These tubes may be sized such that the inner camera tube 110 fits within the intermediate camera tube 108 and the intermediate camera tube 108 fits within the outer camera tube 106. Further, when assembled, the sizing of the tri-concentric tube configuration may allow space to remain between the outer-radius of the inner camera tube 110 and the inner-radius of the intermediate camera tube 108 and between the outer-radius of the intermediate camera tube 108 and the inner-radius of the outer camera tube 106. This space may create channels through which fluid may pass.

Figure 2:
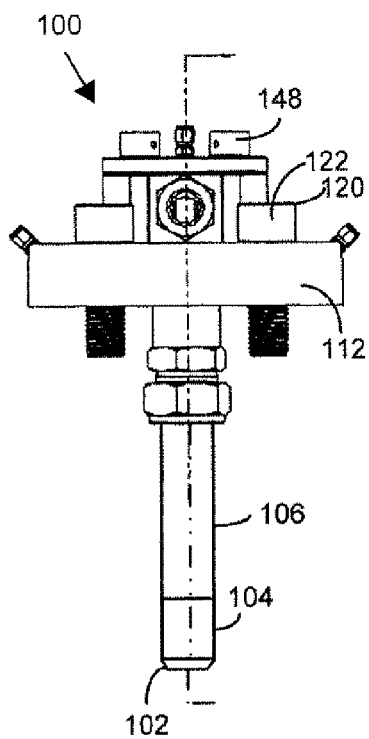
FIG. 2 is a plan view of the liquid-cooled combustion camera of FIG. 1.

The window cap holder 104 may be fixed, by weld or other means known in the art, to one end of the outer camera tube 106, thus forming an integral part. The other end of the outer camera tube 106 may be attached and sealed to a camera mounting flange 112 via a tube compression fitting 114. The camera mounting flange 112 may include a central opening 116 into which the tube compression fitting 114 may mount. As described in more detail below and shown in more detail in FIGS. 2 and 3, the camera mounting flange 112 also may include interior channels that direct the flow of liquid through the interior thereof in a particular manner. The camera mounting flange 112 further may include a plurality of openings 118 through which bolts 120 may be used to mount the liquid-cooled combustion camera 100 into a desired location. The camera mounting flange 112 may be made of stainless steel, inconel, or other similar materials known in the art.

The intermediate camera tube 110 may be attached, by weld or other means, to an upper housing 122, thus forming an integral part. The upper housing may be made of stainless steel, inconel, or other similar materials known in the art. The upper housing 122 may include an inlet 124 and an outlet 126. The inlet 124 may connect to an inlet fitting 128 so that the inlet 124 may be connected to a supply hose (not shown). A pump (not shown) may circulate pressurized liquid through the supply hose and into the inlet 124. The pump may be any pump known in the art, such as a centrifugal pump, reciprocating pump or other similar pumps and fluid moving devices. The outlet 124 may connect to an outlet fitting 130 such that the outlet 126 may be connect to a drain hose (not shown). As shown in more detail in FIGS. 2 and 3, the upper housing 122 further may include interior channels that may direct the flow of water through the interior thereof in a particular manner.

An inlet interior channel 202 in the upper housing 122 may direct the flow of water to from the inlet 124 to the space between the outer-radius of the inner camera tube 110 and the inner-radius of the intermediate camera tube 108. An outlet channel 132 in the upper housing 122 may direct the flow of liquid coolant from a connecting channel 204 that is formed within the camera mounting flange 112 to the outlet 126. The connecting channel 204 may direct the flow of liquid coolant from the space between the outer-radius of the intermediate camera tube 108 and the inner-radius of the outer camera tube 106 to the outlet channel 132. The upper housing 114 may be sealed to the camera mounting flange 112 by an o-ring 134. The connecting channel 204 of the camera mounting flange 112 may be sealed to the outlet channel 132 of the upper housing 122 by an o-ring 136. By machining these cooling passages in the camera mounting flange 112 and the upper housing 122, which together may be referred to as the housing of the assembly, the overall size of the device may be reduced, which is significant given the space constraints associated with the installation of observation and test devices in commercial combustion devices.

A camera holder 138 may support and align the camera 103, which may be a CCD camera, in proximity to the window cap 102 during use. The CCD camera 103 may be selected from cameras of this type known in the art. A plurality of screws 139 may rigidly fix the CCD camera 103 in place in the camera holder 138. The camera holder 110 may be welded or attached by other means known in the art to one end of the inner camera tube 110. A camera cable 140 of the CCD camera then may be routed up the inner camera tube 110 and directed into the water supply hose, where it may exit the gas turbine to connect with camera imaging equipment (not shown) known in the art so that the images the CCD camera 103 views may be examined and recorded. This approach may position the CCD camera 103 in close proximity to the combustion flame with little or no light attenuation, which may produce a bright, clear, and sharp image of the combustion process while protecting the low temperature CCD camera 103 and camera cable 140 from the high temperatures of the turbine environment.

At its other end, the inner camera tube 110 may be fixed to a four bolt flange 141. The four bolt flange 141 may align with several openings (not shown) on the top surface of the upper housing 122 and be attached thereto by bolts 142, which, when assembled, may mechanically fix and align the inner camera tube 110 in the upper housing 114 and within the intermediate camera tube 108.

An upper camera flange 144 and o-ring 146 may be positioned above the four bolt flange 141 and used in conjunction with a plurality of sealing bolts 148 to seal and draw the assembly together. The sealing bolts 148 may feed through openings 150 in the upper camera flange 144 and openings 152 in the upper housing 122 to insert into treaded openings (not shown) in the top surface of the camera mounting flange 112. In drawing together the assembly, the sealing bolts 148 also may mechanically fix and align the intermediate camera tube 108 in the outer camera tube 106. Those of ordinary skill in the art will appreciate that other known means may be used to seal and draw the assembly together.

The design of the liquid-cooled combustion camera 100 may allow the device to be efficiently assembled and serviced. For example, if the window cap 102 becomes damaged, it may be efficiently replaced by disconnecting the outer camera tube 106 from the tube compression fitting 114 and replacing the window cap 102/window cap holder 104/outer camera tube 106 assembly with a new one.

Further, the use of a brazed quartz window cap 102 may allow the diameter of the camera housing, i.e., which generally comprises the diameter of the window cap 102 and the window cap holder 104 or similar components, to be reduced to a 1-inch (about 2.54 cm) or less diameter by eliminating threaded mechanical attachments. Brazing the quartz to the metal holder may fuse the quartz and metal together, thus forming a hermatic seal. As such, mechanical fasteners may not be required to restrain/fix the quartz to the metal, which may allow for the reduction in size of the assembly. The brazed quartz approach also may eliminate the need for high temperature gaskets or seals that typically require frequent servicing in high temperature and pressure environments. That is, the seal formed by the brazed quartz approach may eliminate the need for gaskets or other seals.

Also, the camera holder 138/inner camera tube 110/four bolt flange 141 assembly may allow for efficient installation and replacement of the CCD camera 103. The CCD camera 103 may be installed by inserting it down the inner camera tube 110 into the camera holder 138 and tightening the three screws 139 while the inner camera tube 110 is removed from the upper housing 122. The inner support tube 110 then may be inserted into the upper housing 122 and fixed into place with the seal bolts 148.

In use, the liquid-cooled combustion camera assembly 100 may protect and cool a CCD camera 103 that is inside the high pressure and high temperature environment of an industrial gas turbine with an internal flow of liquid coolant. The greater cooling capacity of water over air may allow the size of the camera housing to be reduced. For this example of use, the liquid coolant will be described as water, though other liquids may be used.

Figure 3:
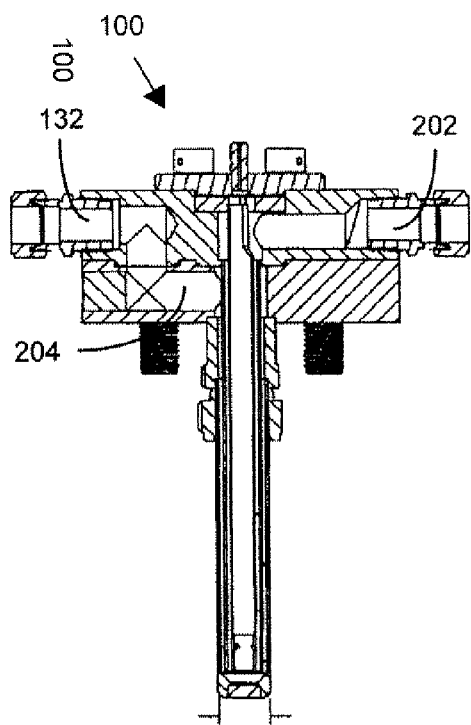
FIG. 3 is a side cross-sectional view of the liquid-cooled combustion camera of FIG. 1.
Figure 4:
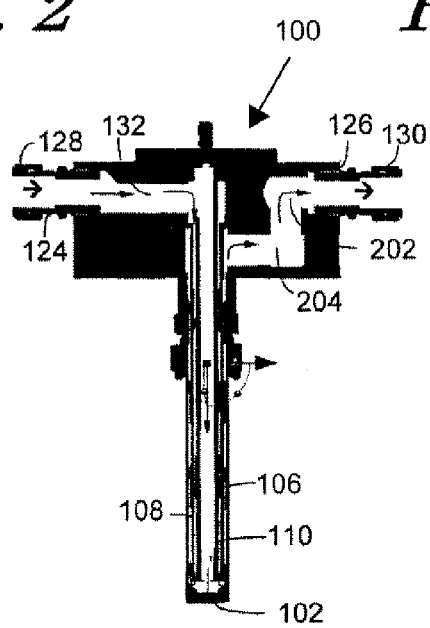
FIG. 4 is a side cross-sectional view illustrating the flow of the liquid coolant through the liquid-cooled combustion camera of FIG. 1.

As shown in FIG. 3, cooling water may enter the upper housing 122 through inlet 124 from outside the turbine via a flexible metal hose (not shown) that attaches to the inlet fitting 128. A water pump (not shown) may supply a flow of pressurized water through the flexible metal hose. The water may be supplied at a pressure of between 10 to 80 psi and at a flow rate of about 5 to 30 gal/s (approximately 0.32 to 1.89 l/s). The cooling water then may flow through the inlet interior channel 202 to the space defined by the outer radius of the inner camera table 110 and the inner radius of the intermediate camera tube 108. The water then may flow down this space toward the window cap 102. When the cooling water reaches the window cap 102, the window cap 102 may redirect the flow 180 degrees such that the cooling water is directed to the space defined by the outer radius of the intermediate camera tube 108 and the inner radius of the outer camera tube 106. The cooling water may then flow through this space back toward the camera mounting flange 112. At the camera mounting flange 112, the cooling water may be directed into the connecting channel 204 machined in the camera mounting flange 112. From the connecting channel 204, the cooling water may be directed into the outlet channel 132 in the upper housing 122. The cooling water may then flow through the outlet channel 132 to the outlet 126 and the outlet fitting 130, where it may be carried away by a flexible metal hose (not shown) that is connected to the outlet fitting 130. In this manner, the camera 103 may be cooled without discharging any coolant into the combustion chamber that might affect the combustion process. The coolant may enter the assembly at about 80° F. (approximately 26.7° C.) and exit it at about 92° F. (approximately 33.3° C.). Being cooled in this manner, the liquid-cooled combustion camera 100 may operate within an industrial gas turbine, where often pressures exceed 350 psi and temperatures exceed 900° F. (approximately 482.2° C.).

Figure 5:
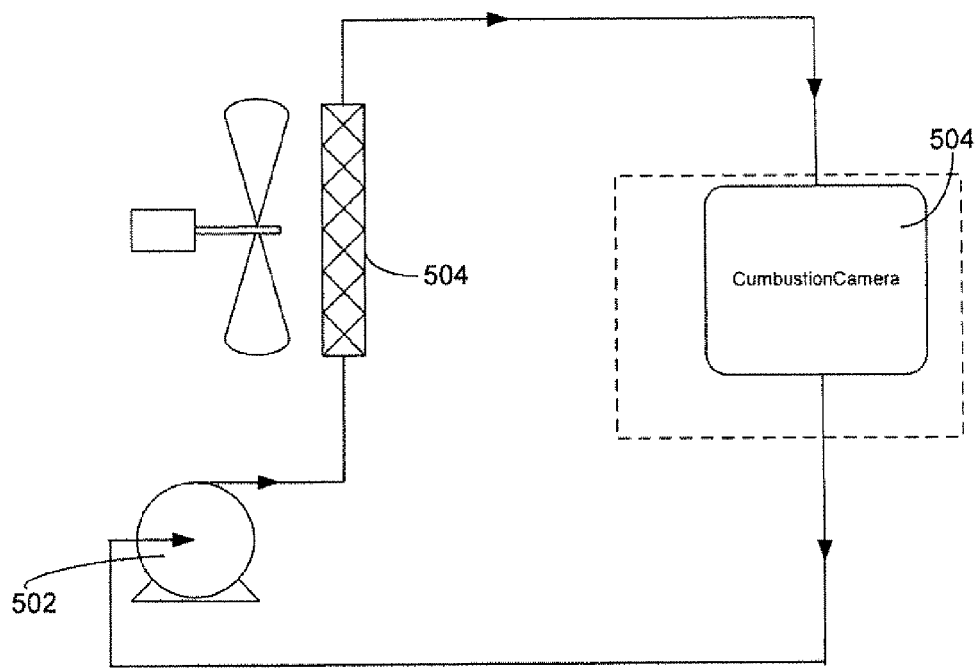
FIG. 5 is a schematic of an example of a closed-loop cooling system that may be used with the liquid-cooled combustion camera of FIG. 1.

As shown in FIG. 5, the cooling water exiting the assembly then may be recirculated using a water pump 502, heat exchanger 504 and other devices and valves known in the art (not shown), thus creating a closed loop cooling system. In the heat exchanger 504, the cooling water may dissipate the energy absorbed during the flow through the combustion camera assembly 100 before it is recirculated in the assembly by the water pump 502. Those of ordinary skill in the art will appreciate other methods of satisfying this heat transfer objective.

It should be apparent that the foregoing relates only to the preferred embodiments of the present invention and that numerous changes and modifications may be made herein without departing from the spirit and scope of the invention as defined by the following claims and the equivalents thereof.

What is claimed is:

1. A liquid-cooled camera assembly that includes a camera for viewing the combustion process in an industrial gas turbine, comprising:
    a tri-concentric tube assembly; and
    a window cap positioned at a first end of the tri-concentric tube assembly;
    wherein the camera is positioned adjacent to and behind the window cap and the tri-concentric tube assembly forms channels between the tubes that direct the flow of coolant to the camera from an inlet and from the camera to an outlet.

2. The liquid-cooled combustion camera of claim 1, wherein the coolant is water.

3. The liquid-cooled combustion camera of claim 1, wherein the width of the window cap does not exceed 1 inch (2.54 cm).

4. The liquid-cooled combustion camera of claim 1, wherein the window cap is cylindrical and does not exceed 1 inch (2.54 cm) in diameter.

5. The liquid-cooled combustion camera of claim 1, wherein the window cap comprises brazed quartz.

6. The liquid-cooled combustion camera of claim 1, further comprising liquid circulation means for delivering a flow of liquid coolant to the inlet and draining the flow of liquid coolant from the outlet.

7. The liquid-cooled combustion camera of claim 1, further comprising a housing connected to a second end of a tri-concentric tube assembly;
    wherein the housing includes the inlet, which is connected to a supply hose, and the outlet, which is connected to a drain hose.

8. The liquid-cooled combustion camera of claim 7, wherein the housing includes a plurality of housing channels that direct the flow of water from the inlet to the tri-concentric tube assembly and from the tri-concentric tube assembly to the outlet.

9. The liquid-cooled combustion camera of claim 8, wherein the tri-concentric tube assembly comprises an inner camera tube, an intermediate camera tube, and an outer camera tube; and
    wherein the inner camera tube is positioned within the intermediate camera tube to create a first coolant channel and the intermediate camera tube is positioned within the outer camera tube to create a second coolant channel.

10. The liquid-cooled combustion camera of claim 9, wherein a first housing channel directs the flow of coolant from the inlet to the first coolant channel and a second housing channel directs the flow of coolant from the second coolant channel to the outlet.

11. A liquid-cooled camera assembly that includes a camera for viewing the combustion process in an industrial gas turbine, comprising:
   a tri-concentric tube assembly that includes an inner camera tube, an intermediate camera tube, and an outer camera tube;
   a window cap positioned at a first end of the tri-concentric tube assembly; and
   a housing connected to a second end of a tri-concentric tube assembly that includes an inlet and an outlet and a plurality of housing channels that direct the flow of water from the inlet to the tri-concentric tube assembly and from the tri-concentric tube assembly to the outlet;
   wherein the camera is positioned adjacent to and behind the window cap and the tri-concentric tube assembly forms channels between the tubes that direct the flow of coolant to the camera from the inlet and from the camera to the outlet.

12. The liquid-cooled combustion camera of claim 11, wherein the housing further comprises an upper housing unit that attaches to the intermediate camera tube and a camera mounting flange that attaches to the outer camera tube; and
   wherein attaching the upper housing unit to the camera mounting flange favorably positions the intermediate camera tube within the outer camera tube.

13. The liquid-cooled combustion camera of claim 12, wherein the camera mounting flange includes a plurality of openings for mounting the liquid-cooled camera in a desired location.

14. The liquid-cooled combustion camera of claim 12, further comprising a inner camera tube flange that attaches to a first end of the inner camera tube;
   wherein attaching the inner camera tube flange to the upper housing unit favorably positions the inner camera tube within the intermediate camera tube.

15. The liquid-cooled combustion camera of claim 12, wherein the camera mounts to a second end of the inner camera tube; and
   wherein attaching the inner camera tube flange to the upper housing unit positions the camera in a desired location adjacent to the window cap.

16. The liquid-cooled combustion camera of claim 11, wherein the liquid coolant is redirected from the first coolant channel to the second cooling channel by the inner surface of the window cap.

17. The liquid-cooled combustion camera of claim 11, wherein a camera cable, which connects the camera to camera imaging equipment outside of the industrial gas turbine, is fed to the camera through the inner camera tube.

18. The liquid-cooled combustion camera of claim 11, wherein a camera cable, which connects the camera to camera imaging equipment outside of the industrial gas turbine, enters the liquid-cooled camera assembly through either a supply hose connected to the inlet or a drain hose connected to the outlet.

19. The liquid-cooled combustion camera of claim 11, wherein the liquid coolant that is drained from the drain hose is recirculated to the supply hose through a water pump and a heat exchanger.

20. A liquid-cooled camera assembly that includes a camera for viewing the combustion process in an industrial gas turbine, comprising:
   a tri-concentric tube assembly that includes an inner camera tube, an intermediate camera tube, and an outer camera tube;
   a window cap positioned at a first end of the tri-concentric tube assembly;
   a housing connected to a second end of a tri-concentric tube assembly that includes an inlet and an outlet and a plurality of housing channels that direct the flow of water from the inlet to the tri-concentric tube assembly and from the tri-concentric tube assembly to the outlet; and
   a camera cable that connects the camera to camera imaging equipment outside of the industrial gas turbine;
   wherein the inner camera tube is positioned within the intermediate camera tube to create a first coolant channel and the intermediate camera tube is positioned within the outer camera tube to create a second coolant channel, said first coolant channel and said second coolant channel directing the flow of coolant to the camera from the inlet and from the camera to the outlet;
   wherein a first housing channel directs the flow of coolant from the inlet to the first coolant channel and a second housing channel directs the flow of coolant from the second coolant channel to the outlet; and
   wherein a camera cable enters the liquid-cooled camera assembly through either a supply hose connected to the inlet or a drain hose connected to the outlet and is fed to the camera through the inner camera tube.

* * * * *